US009479751B2

(12) United States Patent
Kawakami

(10) Patent No.: US 9,479,751 B2
(45) Date of Patent: Oct. 25, 2016

(54) ELECTRONIC FLASH, ELECTRONIC CAMERA AND LIGHT EMITTING HEAD

(71) Applicant: FUJIFILM CORPORATION, Tokyo (JP)

(72) Inventor: Chikuni Kawakami, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 87 days.

(21) Appl. No.: 14/165,376

(22) Filed: Jan. 27, 2014

(65) Prior Publication Data

US 2014/0139702 A1    May 22, 2014

Related U.S. Application Data

(62) Division of application No. 11/980,588, filed on Oct. 31, 2007, now Pat. No. 8,675,124, which is a division of application No. 11/482,171, filed on Jul. 7, 2006, now Pat. No. 8,634,021, which is a division of application No. 09/911,736, filed on Jul. 25, 2001, now Pat. No. 7,106,378.

(30) Foreign Application Priority Data

Jul. 25, 2000   (JP) ................................ 2000-223505
Jul. 11, 2001   (JP) ................................ 2001-210598

(51) Int. Cl.
*H04N 9/73*      (2006.01)
*G03B 15/05*     (2006.01)
(Continued)

(52) U.S. Cl.
CPC .............. *H04N 9/735* (2013.01); *G03B 15/05* (2013.01); *H04N 5/2354* (2013.01); *H04N 9/04* (2013.01); *H05B 33/0803* (2013.01);
(Continued)

(58) Field of Classification Search
CPC .................................................... H04N 9/735

USPC ........................... 348/223.1, 224.1; 358/475
See application file for complete search history.

(56) References Cited

U.S. PATENT DOCUMENTS 4,281,337 A    7/1981 Nakamura
4,462,667 A    7/1984 Fujii et al.
(Continued)

FOREIGN PATENT DOCUMENTS

DE         3307369 A1    9/1983
DE    40 11 842 A1    10/1991
(Continued)

OTHER PUBLICATIONS

Summons to attend oral proceedings pursuant to Rule 115(1) EPC issued on Jun. 3, 2015 in corresponding European Patent Application No. 10011018.8.

(Continued)

*Primary Examiner* — Joel Fosselman
(74) *Attorney, Agent, or Firm* — Birch, Stewart, Kolasch & Birch, LLP

(57) ABSTRACT

An electronic camera having an electronic flash including a plurality of light emitting diodes (LEDs) that emit different wavelength light is disclosed. Electric energy is supplied to a capacitor to the LEDs. A system controller controls light emitting amounts of the LEDs so that a color temperature of the electronic flash light becomes a color temperature that has been manually set with a color temperature setting switch or a color temperature of a light source determined by color temperature sensors.

16 Claims, 13 Drawing Sheets

(51) Int. Cl.
*H04N 5/235* (2006.01)
*H05B 33/08* (2006.01)
*H04N 9/04* (2006.01)

(52) U.S. Cl.
CPC ..... *H05B 33/0818* (2013.01); *H05B 33/0842* (2013.01); *H05B 33/0863* (2013.01); *H05B 33/0869* (2013.01); *H05B 33/0872* (2013.01); *G03B 2215/0521* (2013.01); *G03B 2215/0535* (2013.01); *G03B 2215/0567* (2013.01); *Y02B 20/346* (2013.01)

(56) References Cited

U.S. PATENT DOCUMENTS

| | | | |
|---|---|---|---|
| 4,485,336 A | | 11/1984 | Yoshiyama et al. |
| 4,847,680 A | | 7/1989 | Okino |
| 4,883,333 A | | 11/1989 | Yanez |
| 5,065,232 A | | 11/1991 | Kondo |
| 5,109,248 A | | 4/1992 | Petrakos et al. |
| 5,301,090 A | | 4/1994 | Hed |
| 5,408,084 A | | 4/1995 | Brandorff et al. |
| 5,420,630 A | * | 5/1995 | Takei ............ H04N 9/735 348/223.1 |
| 5,442,408 A | | 8/1995 | Haruki et al. |
| 5,448,331 A | | 9/1995 | Hamada et al. |
| 5,504,524 A | | 4/1996 | Lu et al. |
| 5,541,649 A | | 7/1996 | Yamamoto et al. |
| 5,625,470 A | * | 4/1997 | Ueta ............ H04N 1/484 358/475 |
| 5,666,571 A | | 9/1997 | Matsumura |
| 5,745,176 A | | 4/1998 | Lebens |
| 5,773,130 A | | 6/1998 | So et al. |
| 5,783,909 A | | 7/1998 | Hochstein |
| 5,815,204 A | | 9/1998 | Abe et al. |
| 5,895,128 A | | 4/1999 | Kishimoto et al. |
| 5,978,022 A | | 11/1999 | Aoki et al. |
| 6,016,038 A | * | 1/2000 | Mueller ............ H05B 33/0857 315/291 |
| 6,081,076 A | | 6/2000 | Ogawa et al. |
| 6,222,995 B1 | | 4/2001 | Uchida |
| 6,256,067 B1 | | 7/2001 | Yamada |
| 6,275,256 B1 | | 8/2001 | Olczak et al. |
| 6,379,022 B1 | | 4/2002 | Amerson et al. |
| 6,441,558 B1 | | 8/2002 | Muthu et al. |
| 6,744,469 B1 | | 6/2004 | Gudenburr et al. |
| 6,850,631 B1 | | 2/2005 | Oda et al. |
| 6,930,704 B1 | | 8/2005 | Hamada et al. |
| 2002/0154809 A1 | | 10/2002 | Yamagishi et al. |
| 2002/0172514 A1 | | 11/2002 | Gabello et al. |

FOREIGN PATENT DOCUMENTS

| | | |
|---|---|---|
| DE | 298 05 743 U1 | 12/1998 |
| EP | 0516398 A2 | 12/1992 |
| GB | 2 120 403 A | 11/1983 |
| JP | 58-92747 U | 6/1983 |
| JP | 58-149033 A | 9/1983 |
| JP | 61-105977 A | 5/1986 |
| JP | 63-261331 A | 10/1988 |
| JP | 4-107888 A | 4/1992 |
| JP | 5-134301 A | 5/1993 |
| JP | 5-191715 A | 7/1993 |
| JP | 6-8933 | 2/1994 |
| JP | 6-15006 | 2/1994 |
| JP | 06-308586 A | 11/1994 |
| JP | 7-1599 U | 1/1995 |
| JP | 8-331396 | 12/1996 |
| JP | 9-127897 A | 5/1997 |
| JP | 9-167861 A | 6/1997 |
| JP | 10-81032 | 3/1998 |
| JP | 10-93856 A | 4/1998 |
| JP | 10-133608 A | 5/1998 |
| JP | 10-187928 | 7/1998 |
| JP | 10-206942 A | 8/1998 |
| JP | 10-239923 | 9/1998 |
| JP | 11-133490 A | 5/1999 |
| JP | 11-194409 A | 7/1999 |
| JP | 11-242269 A | 9/1999 |
| JP | 2000-98105 | 4/2000 |
| JP | 2000-111790 A | 4/2000 |
| JP | 2000-224608 A | 8/2000 |
| WO | WO 99/39319 A2 | 8/1999 |

OTHER PUBLICATIONS

European Official Communication, dated Mar. 1, 2012, for Application No. 07021390.5.
Gostick, Mark, "Applications for Light Emitting Polymer Displays", Electronic Engineering, vol. 68, No. 839, Nov. 1, 1996, pp. 67, 69.
Japanese Office Action dated Aug. 11, 2009 for corresponding Japanese Applicaiton No. 2006-152222.
Japanese Office Action dated Aug. 11, 2009 for corresponding Japanese Application No. 2007-211046.
Japanese Office Action dated Aug. 7, 2009 for corresponding japanese Application No. 2007-071094.
Japanese Office Action, Notice of Reasons for Rejection, Dec. 27, 2010.
Office Action in Japan Application No. 2007-211047 mailed May 7, 2010.
Questioning, Dec. 16, 2010.
Decision to Refuse a European Patent Application issued in corresponding European Patent Application No. 10011018.8 on Dec. 8, 2015.

* cited by examiner

F I G. 3 (A)
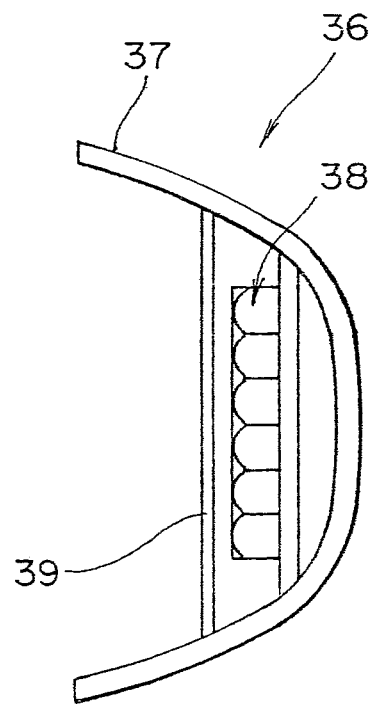
F I G. 3 (B)
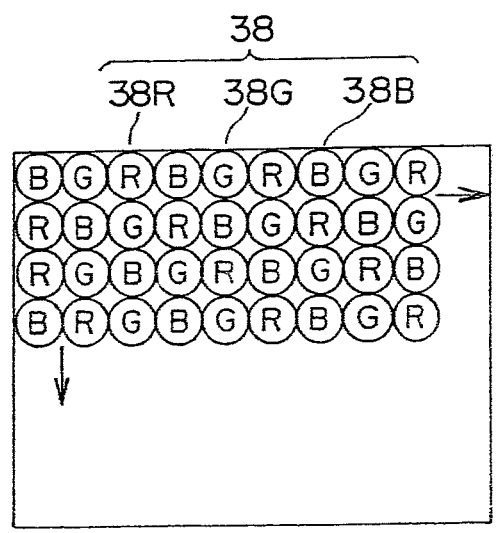

FIG. 5(A) ELECTRONIC FLASH ON 
FIG. 5(B) CHARGING 
FIG. 5(C) CHARGING END 
FIG. 5(D) READY FOR DISCHARGING 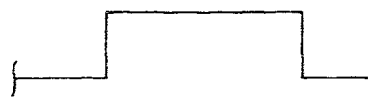
FIG. 5(E) COLOR TEMPERATURE READING 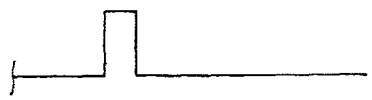
FIG. 5(F) R, G AND B LIGHT EMISSION LEVEL SETTING 
FIG. 5(G) SHUTTER RELEASE (LIGHT EMISSION) 

F I G. 7
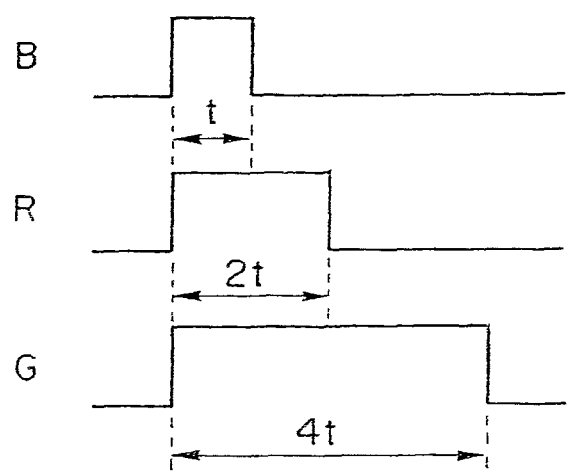
F I G. 8
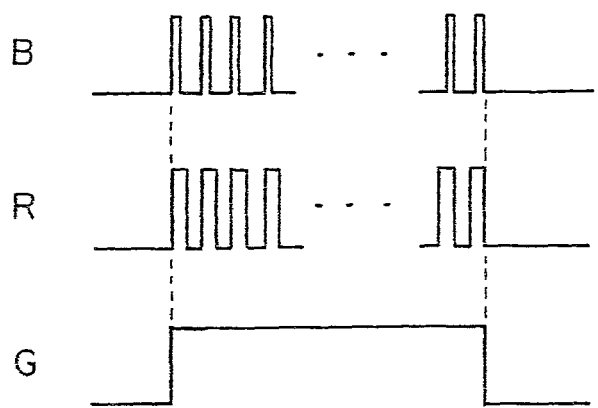

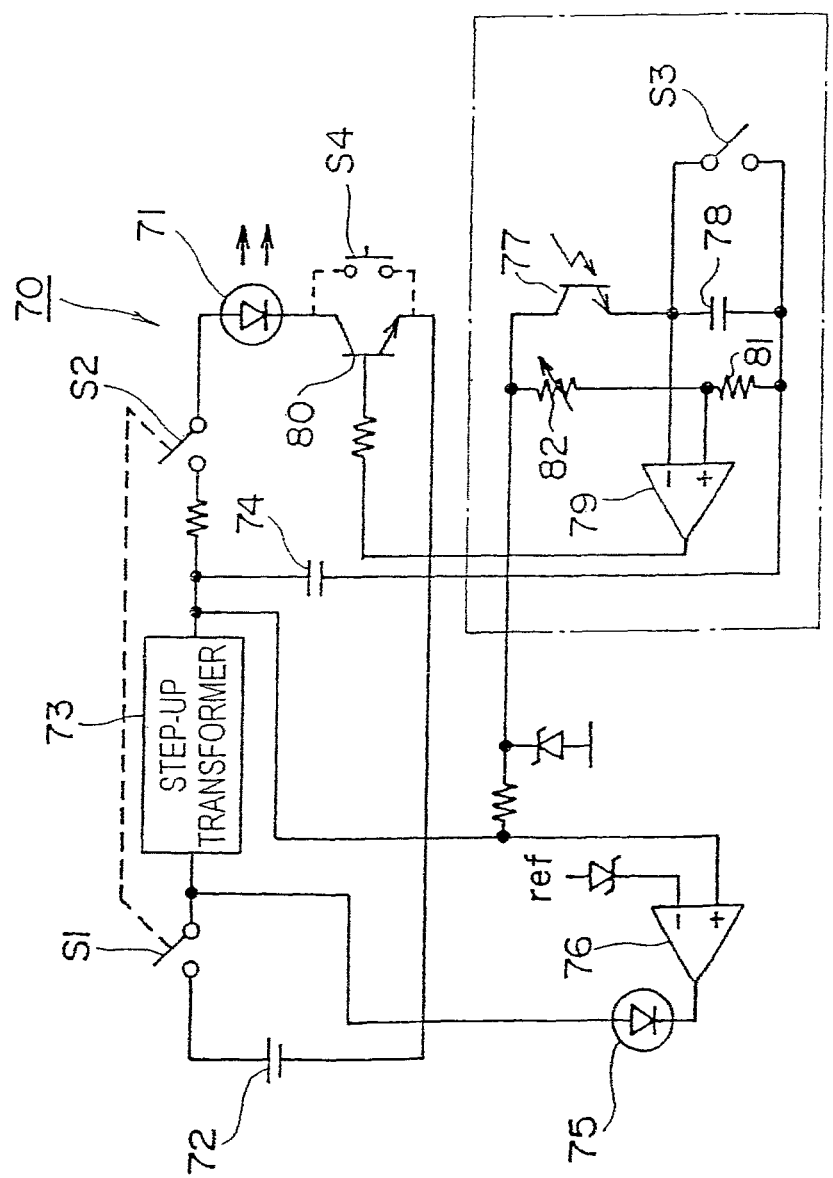
F I G. 9

F I G. 1 5
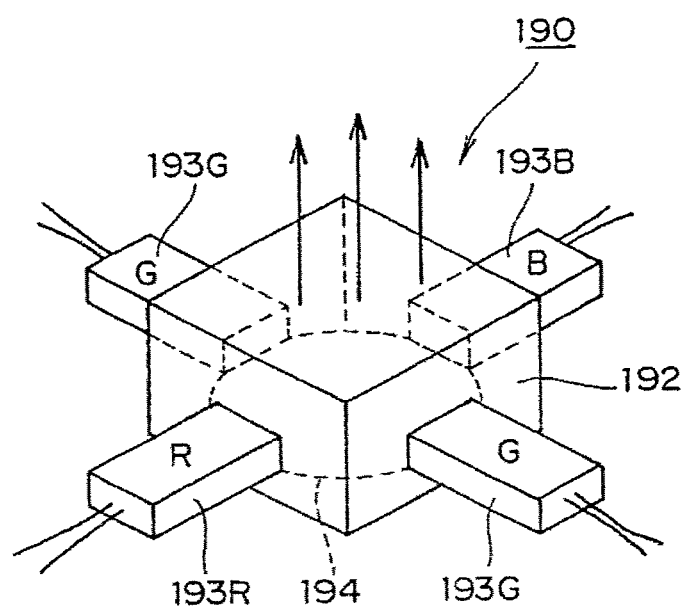

ELECTRONIC FLASH, ELECTRONIC CAMERA AND LIGHT EMITTING HEAD

This application is a Divisional of application Ser. No. 11/980,588, filed on Oct. 31, 2007, which is a Divisional of application Ser. No. 11/482,171, filed on Jul. 7, 2006, which is a Divisional of application Ser. No. 09/911,736, filed on Jul. 25, 2001, and for which priority is claimed under 35 U.S.C. §120; and this application claims priority of Application No. 2000-223505 filed in Japan on Jul. 25, 2000 and Application No. 2001-210598 filed in Japan on Jul. 11, 2001 under 35 U.S.C. §119; the entire contents of all are hereby incorporated by reference.

BACKGROUND OF THE INVENTION

1. Field of the Invention

The present invention relates generally to an electronic flash, an electronic camera, and a light emitting head. The present invention relates more particularly to an electronic flash using light-emitting devices such as light emitting diodes (LEDs), an electronic camera and a light emitting head.

2. Description of the Related Art

An electronic flash of a camera has a xenon tube as a light source.

There have been high-luminance LEDs that emit red, green, amber, yellow, and milky-white lights, and a high-luminance blue LEDs has been used. These LEDs are mainly used as indicators of various apparatuses.

However, when an electronic flash is used to perform back light correction for the sun light in the morning or evening, the colors of the picture can be unnatural since the spectral characteristics of the xenon tube are close to those of the daylight. Also, the electronic flash with the xenon tube can emit the light for only a few milliseconds, and it can not be used for slow shutter speeds.

SUMMARY OF THE INVENTION

In view of the foregoing, it is an object of the present invention to provide a new electronic flash of a camera using LEDs.

It is an object of the present invention to provide an electronic flash of a camera and an electronic camera that manually or automatically changes a color temperature of an electronic flash light to prevent unnatural colors of a picture.

It is an object of the present invention to provide a light emitting head that can be applied to an electronic flash with light emitting devices such as LEDs.

To achieve the above-mentioned object, the present invention is directed to an electronic flash of a camera, comprising: an electronic flash light source comprising a light emitting diode; and a light emission control device that makes the electronic flash light source emit light by supplying electric energy to the light emitting diode.

The electronic flash light source preferably comprises R, G and B light emitting diodes.

Preferably, the electronic flash further comprises a color temperature setting device that manually sets a color temperature of the light emitted from the electronic flash light source, wherein the light emission control device controls ratios between light emission amounts of the R, G and B light emitting diodes so that a color temperature of the light emitted from the electronic flash light source becomes the color temperature set by the color temperature setting device.

Preferably, the electronic flash further comprises a color temperature determining device that determines a color temperature of subject light, wherein the light emission control device controls ratios between light emission amounts of the R, G and B light emitting diodes so that a color temperature of the light emitted from the electronic flash light source becomes the color temperature determined by the color temperature determining device. Thus, the color temperature of the electronic flash light can be automatically controlled to that of the subject light, and this can prevent unnatural colors of the picture.

Preferably, the electronic flash further comprises a capacitor with a large capacity that is charged by a battery, wherein the light emission control device supplies the electric energy from the capacitor to the light emitting diode. Thus, the electric energy can be obtained with the small battery. In addition, fall of the voltage of the battery can be prevented at the light emission, and misoperation of the other circuits can be prevented.

Preferably, the electronic flash further comprises a temperature sensor that determines a peripheral temperature of the light emitting diode, wherein the light emission control device controls the electric energy to obtain a desired light emission amount according to the peripheral temperature determined by the temperature sensor. Though the light emitting diodes change the light emitting amounts due to their peripheral temperature, the desired light emission amount can still be obtained.

To achieve the above-mentioned object, the present invention is directed to an electronic flash of a camera, comprising: an electronic flash light source that emits electronic flash light; and an adjusting device that adjust a color temperature of the electronic flash light emitted from the electronic flash light source.

Preferably, the adjusting device comprises a color temperature setting device that manually sets a color temperature of the electronic flash light; and a light emission control device that controls a color temperature of the electronic flash light to the color temperature set by the color temperature setting device.

Preferably, the adjusting device comprises a color temperature determining device that determines a color temperature of subject light; and a light emission control device that controls a color temperature of the electronic flash light to the color temperature determined by the color temperature determining device.

Preferably, the color temperature determining device has determining devices that convert color components of the subject light into electric signals and determines the color temperature of the subject light according to a ratio between determination signals of the determining devices. The determining devices may be red and blue determining devices or red, green and blue determining devices.

The color temperature determining device can determine the color temperature of the light source according to color image signals of a subject image captured by imaging devices of the camera. The imaging devices of the camera can be also used as a part of the color temperature determining device.

Preferably, the electronic flash light source is R, G and B light emitting devices and light emitting amounts from the R, G and B light emitting devices can be separately controlled. The R, G and B light emitting devices can be light emitting diodes, organic electroluminescences or plasma light emitting devices.

Preferably, the electronic flash further comprises a capacitor with a large capacity that is charged by a battery, and the adjusting device supplies the electric energy from the capacitor to the light emitting devices.

Preferably, the electronic flash further comprises a temperature sensor that determines a peripheral temperature of the light emitting diodes, and the adjusting device controls the electric energy to obtain a desired light emission amount according to the peripheral temperature determined by the temperature sensor.

Preferably, the adjusting device adjusts the color temperature of the electronic flash light by controlling a ratio between the light emitting amounts from the R, G and B light emitting devices.

The adjusting device can control the ratio between the light emitting amounts from the R, G and B light emitting devices by separately turning on and off the R, G and B light emitting devices.

Preferably, the adjusting device comprises a light adjusting sensor that determines one of an amount of reflected light from a subject emitted from one of the R, G and B light emitting devices of which light emitting amount is smallest among the R, G and B light emitting devices and an amount of reflected light from the subject emitted from the R, G and B light emitting devices; a first light emission controlling device that stops light emission of the one of the R, G and B light emitting devices when the one of the amounts determined by the light adjusting sensor reaches a predetermined reference value according to the ratios between the light emitting amounts from the R, G and B light emitting devices; a measuring device that measures a light emitting time of the one of the R, G and B light emitting devices; a calculating device that calculates light emitting times of others of the R, G and B light emitting devices according to the light emitting time measured by the measuring device and the ratios between the light emitting amounts from the R, G and B light emitting devices; and a second light emission controlling device that stops light emission of the others of the R, G and B light emitting devices according to the light emitting times calculated by the calculating device. The light emitting amount (light emitting time) of the light emitting devices with the smallest light emitting amount is controlled according to the amount determined by the light adjusting sensor. The light emitting times of the other light emitting devices are calculated according to the light emitting time and the ratio between the light emitting amounts from the R, G and B light emitting devices.

Preferably, the adjusting device comprises a device that turns on and off the R, G and B light emitting devices with duty ratios corresponding to the ratios between the light emitting amounts from the R, G and B light emitting devices; a light adjusting sensor that determines an amount of reflected light from a subject emitted from the R, G and B light emitting devices; and a light emission controlling device that stops light emission of the R, G and B light emitting devices when the amount determined by the light adjusting sensor reaches a predetermined reference value.

The adjusting device may comprise a device that turns on and off R, G and B light emitting devices of numbers according to the ratios between the light emitting amounts from the R, G and B light emitting devices; a light adjusting sensor that determines an amount of reflected light from a subject emitted from the R, G and B light emitting devices; and a light emission controlling device that stops light emission of the R, G and B light emitting devices when the amount determined by the light adjusting sensor reaches a predetermined reference value.

Preferably, the electronic flash light source comprises: a white light source that emits white electronic flash light; and color filters that are arranged movably in front of the white light source, wherein the adjusting device adjusts the color temperature of the electronic flash light by moving at least one of the color filters in front of the white light source.

To achieve the above-mentioned object, the present invention is directed to an electronic camera that stores color image signals of a subject image captured with a taking lens and an imaging device, the electronic camera comprising: a color temperature determining device that determines a color temperature of subject light before a shooting; an electronic flash light source that emits electronic flash light; an automatic white balance correcting device that corrects a white balance of the color image signals according to the color temperature determined by the color temperature determining device at the shooting irrespective of light emission of the electronic flash light source; and an adjusting device that adjusts a color temperature of the electronic flash light to the color temperature determined by the color temperature determining device.

The electronic camera emits the light with the color temperature that is the same as the color temperature of the subject light source, and the white balance is corrected according to the color temperature of the subject light source. The conventional electronic camera corrects the white balance no matter what the color temperature of the subject light source is.

To achieve the above-mentioned object, the present invention is directed to an electronic camera that stores color image signals of a subject image captured with a taking lens and an imaging device, the electronic camera comprising: a color temperature determining device that determines a color temperature of subject light; a recording device that records at least one color temperature determined by the color temperature determining device; a designating device that reads the color temperature recorded in the recording device; an automatic white balance correcting device that corrects a white balance of the color image signals according to the color temperature read by the designating device; an electronic flash light source that emits electronic flash light; and an adjusting device that adjusts a color temperature of the electronic flash light to the color temperature read by the designating device. For example, the user records color temperatures of a spotlight of a ceremonial hall, a ceiling light and a studio light, and reads one of the color temperatures so that the electronic flash emits the light with the read color temperature, and the white balance is corrected according to the color temperature.

The color temperature determining device can determine the color temperature of the subject light from the color image signals of the subject image captured with the taking lens and the imaging device.

To achieve the above-mentioned object, the present invention is directed to a an optical member that is one of a polygonal prism and a cylinder; a light emitting device array provided on a side of the optical member; and a reflecting mirror provided on at least a bottom of the optical member, wherein the light emitting device array emits light out of the optical member through a top of the optical member.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 3(A) and 3(B) are views showing a light source part of a light-emitting part in FIG. 1;

FIGS. 5(A), 5(B), 5(C), 5(D), 5(E), 5(F) and 5(G) are timing charts showing an operation of a system controller in FIG. 4;

FIG. 7 is a timing chart showing a color temperature controlling method in which light emitting times of the LEDs are separately controlled;

FIG. 8 is a timing chart showing a color temperature controlling method in which a duty ratio of the LEDs is controlled;

FIG. 9 is a block diagram showing a second embodiment of an electronic flash of the camera according to the present invention;

FIG. 15 is a perspective view of a diode light emitting head according to the present invention.

DETAILED DESCRIPTION OF THE PREFERRED EMBODIMENTS

This invention will be described in further detail by way of example with reference to the accompanying drawings.

Figure 1:
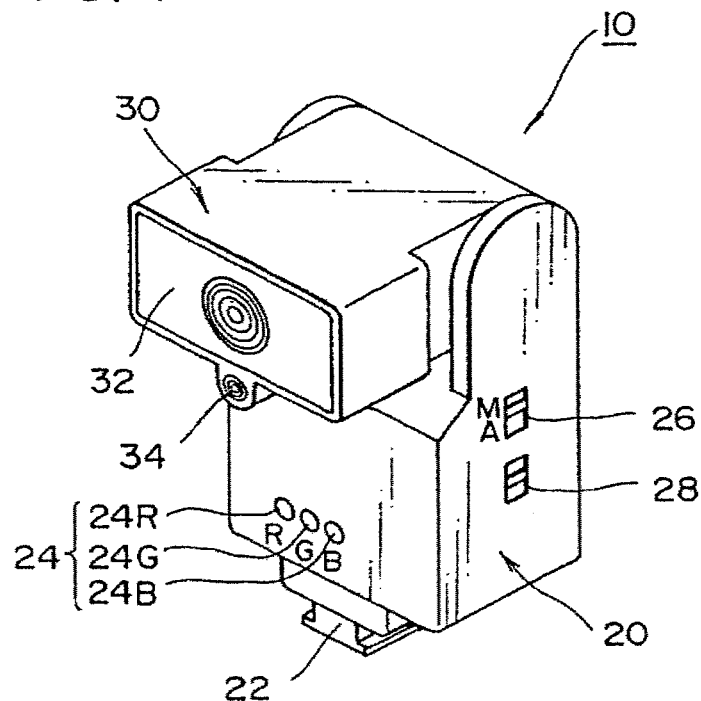
FIG. 1 is a perspective view of an electronic flash of a camera of a first embodiment according to the present invention.

FIG. 1 is a perspective view of an electronic flash 10 for a camera of a first embodiment according to the present invention.

The electronic flash 10 is composed of a body 20 with a hot shoe 22 on its bottom and a light-emitting part 30.

Color temperature sensors 24 (photo sensors 24R, 24G and 24B with R, G and B filters) for measuring a color temperature of subject light are provided on the front of the body 20. A switch 26 for choosing a manual mode or an automatic mode and a color temperature setting switch 28 are provided on the side of the body 20. In the manual mode, a user manually sets a color temperature of an electronic flash light with a color temperature setting switch 28. In the automatic mode, the color temperature of the electronic flash light is automatically set.

A reference numeral 32 denotes a Fresnel lens of the light-emitting part 30, and a reference numeral 34 denotes a light-receiving sensor for adjusting the electronic flash light.

Figure 2:
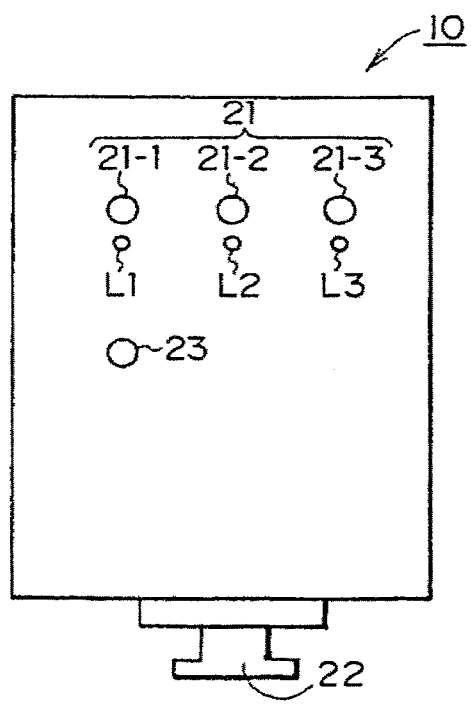
FIG. 2 is a back view of the electronic flash in FIG. 1.

FIG. 2 is a back view of the electronic flash 10. Color temperature recording switches 21 (21-1, 21-2 and 21-3), indicators L1, L2 and L3 and a color temperature reading switch 23 are provided on the back of the electronic flash 10. When one of the color temperature recording switches 21 is pressed, the current color temperature of the subject light measured by the color temperature sensors 24 is recorded in a nonvolatile memory (EEPROM) 25 (see FIG. 4) of the electronic flash 10. The three color temperature recording switches 21 make it possible to record three color temperatures.

Each time the color temperature reading switch 23 is pushed, one of the color temperatures recorded with the color temperature recording switches 21-1, 21-2 and 21-3 is read in order. The indicators L1, L2 and L3 correspond to the color temperature recording switches 21-1, 21-2 and 21-3, respectively, and one of the indicators L1, L2 and L3 corresponding to the selected color temperature is turned on. The color temperature of the electronic flash light is adjusted to the read color temperature.

FIG. 3(A) is a section of a light source part 36 of the light-emitting part 30, and FIG. 3(B) is a front view of the light source part 36.

The light source part 36 is composed of a reflector 37, LEDs 38 (R, G and B LEDs 38R, 38G and 38B) and a diffusion plate 39. The R, G and B LEDs 38R, 38G and 38B are arranged to form an array as shown in FIG. 3(B). The diffusion plate 39 diffuses high-directivity lights emitted from the LEDs 38. The numbers of the LEDs 38R, 38G and 38B does not need to be the same, and they are preferably arranged so that a white light is produced when all the LEDs 38 emit lights.

Figure 4:
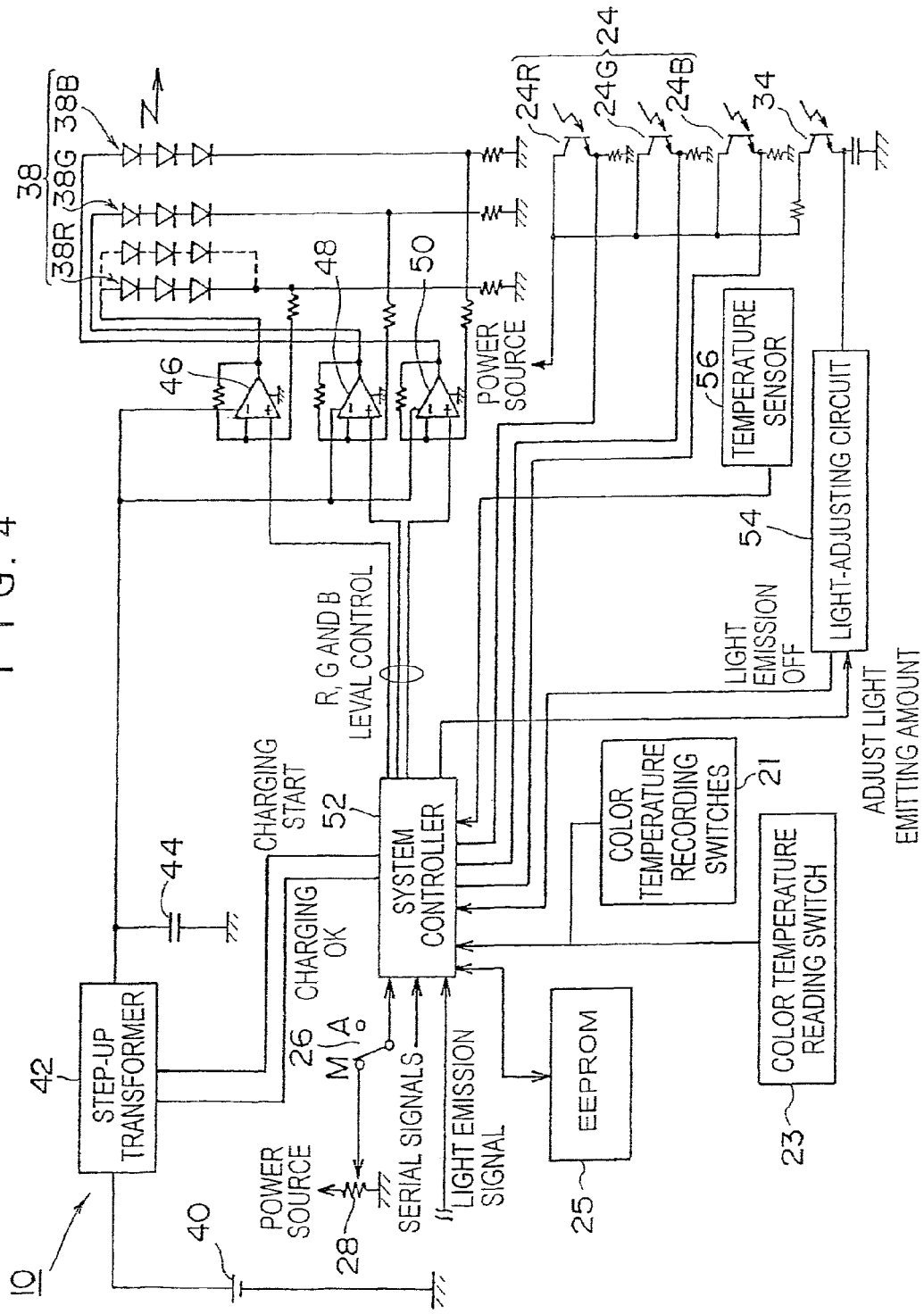
FIG. 4 is a block diagram of the electronic flash in FIG. 1.

FIG. 4 is a block diagram of the electronic flash 10.

The electronic flash 10 has a battery 40, a step-up transformer 42, a large-capacity capacitor 44, operational amplifiers 46, 48 and 50, a system controller 52, a light adjusting circuit 54 and a temperature sensor 56 as well as the color temperature recording switches 21, the color temperature reading switch 23, the color temperature sensors 24, the EEPROM 25, the switch 26, the color temperature setting switch 28, the light-receiving sensor 34 and the LEDs 38.

The system controller 52 controls the electronic flash 10, and makes the step-up transformer 42 output the voltage of 10V from the voltage (for example, 6V) of the battery 40 in order to charge the capacitor 44 with the outputted voltage. The capacitor 44 is charged for two to five seconds, and can discharge to the LEDs 38 for more than 1/60 sec (approximately 16 ms).

The capacitor 44 discharges to the LEDs 38R, 38G and 38B through the operational amplifiers 46, 48 and 50, and the system controller 52 controls the operational amplifiers 46, 48 and 50 to control a light-emitting time and amount of the LEDs 38R, 38G and 38B.

The system controller 52 receives a light-emitting signal from the camera through the hot shoe 22 (see FIG. 1) in synchronization with a shutter release, and receives information (a guide number, etc.) for determining the light-emitting amount in a serial communication. When the switch 26 is on the manual mode, the system controller 52 controls the color temperature of the electronic flash light to that set with the color temperature setting switch 28. When the switch 26 is on the automatic mode, the system controller 52 controls the color temperature of the electronic flash light to that of the subject light determined by the color temperature sensors 24. The color temperature sensors 24 are not limited to those. They determine the color temperature of the subject light according to the ratio between the R, G and B components of the light, but they may do that according to the ratio between the R and B components of the light.

When one of the color temperature recording switches 21 is pushed, the system controller 52 records the current color temperature of the subject light determined by the color temperature sensors 24 in the EEPROM 25. When one of the color temperature reading switches 23 is pushed, the system controller 52 reads the recorded color temperature, and controls the color temperature of the electronic flash light to the read color temperature. For example, the user records color temperatures of a spotlight of a ceremonial hall, a ceiling light and a studio light with the color temperature sensors 24 in the EEPROM 25, and reads one of the color temperatures with one of the color temperature reading switches 23 so that the electronic flash emits the light with the read color temperature.

Since the light amounts of the LEDs change according to their peripheral temperature, a temperature sensor 56 that determines the peripheral temperature of the LEDs 38 is provided. The system controller 52 controls the electric current to the LEDs 38 according to the peripheral temperature determined by the temperature sensor 56.

The operation of the system controller 52 will now be explained with reference to timing charts of FIGS. 5(A), 5(B), 5(C), 5(D), 5(E), 5(F) and 5(G).

On receiving an electronic flash signal (FIG. 5(A)), the system controller 52 outputs a signal to the step-up transformer 42 for starting the charging of the capacitor 44. When the charging is finished, the system controller 52 stops the step-up transformer 42 (FIGS. 5(B) and 5(C)).

When a shutter release button is half pressed, the system controller 52 gets ready for the discharging (FIG. 5(D)) and receives the information (the guide number, etc.) for determining the light emitting amount. When the switch 26 is on the automatic mode, the system controller 52 reads the color temperature of the subject light from one of the color temperature sensors 24. When the switch 26 is on the manual mode, the system controller 52 reads the manually-set color temperature corresponding to the operated color temperature reading switch 23 (FIG. 5(E)).

The system controller 52 determines the light emitting amount according to the received information, outputs a reference value for the light emitting amount to the light adjusting circuit 54, determines the ratio between the light emitting amounts of the LEDs 38R, 38G and 38B according to the color temperature of the subject light, and sets R, G and B light emitting levels from the ratio (FIG. 5(F)).

When the shutter release button is fully pressed, the system controller 52 receives the light emitting signal in synchronization with the shutter release and outputs the R, G and B light emitting levels to positive-sequence input terminals of the operational amplifiers 46, 48 and 50. Signals that corresponds to electric currents to be sent to the LEDs 38R, 38G and 38B are inputted to negative-sequence input terminals of the operational amplifiers 46, 48 and 50, and the operational amplifiers 46, 48 and 50 control the electric currents flowing through the LEDs 38R, 38G and 38B according to the R, G and B light emitting levels.

The LEDs 38 emit the lights with the same color temperature as that of the subject light (FIG. 5(G)).

The light adjusting circuit 54 determines the light emitting amount with the light-receiving sensor 34. When the light emitting amount reaches the reference value, the light adjusting circuit 54 outputs the light-emission stop signal to the system controller 52, which outputs a signal for stopping the light emission of the LEDs 38 to the operational amplifiers 46, 48 and 50. This turns off the electric currents flowing through the LEDs 38 to stop the light emission of the LEDs 38.

Figure 6:
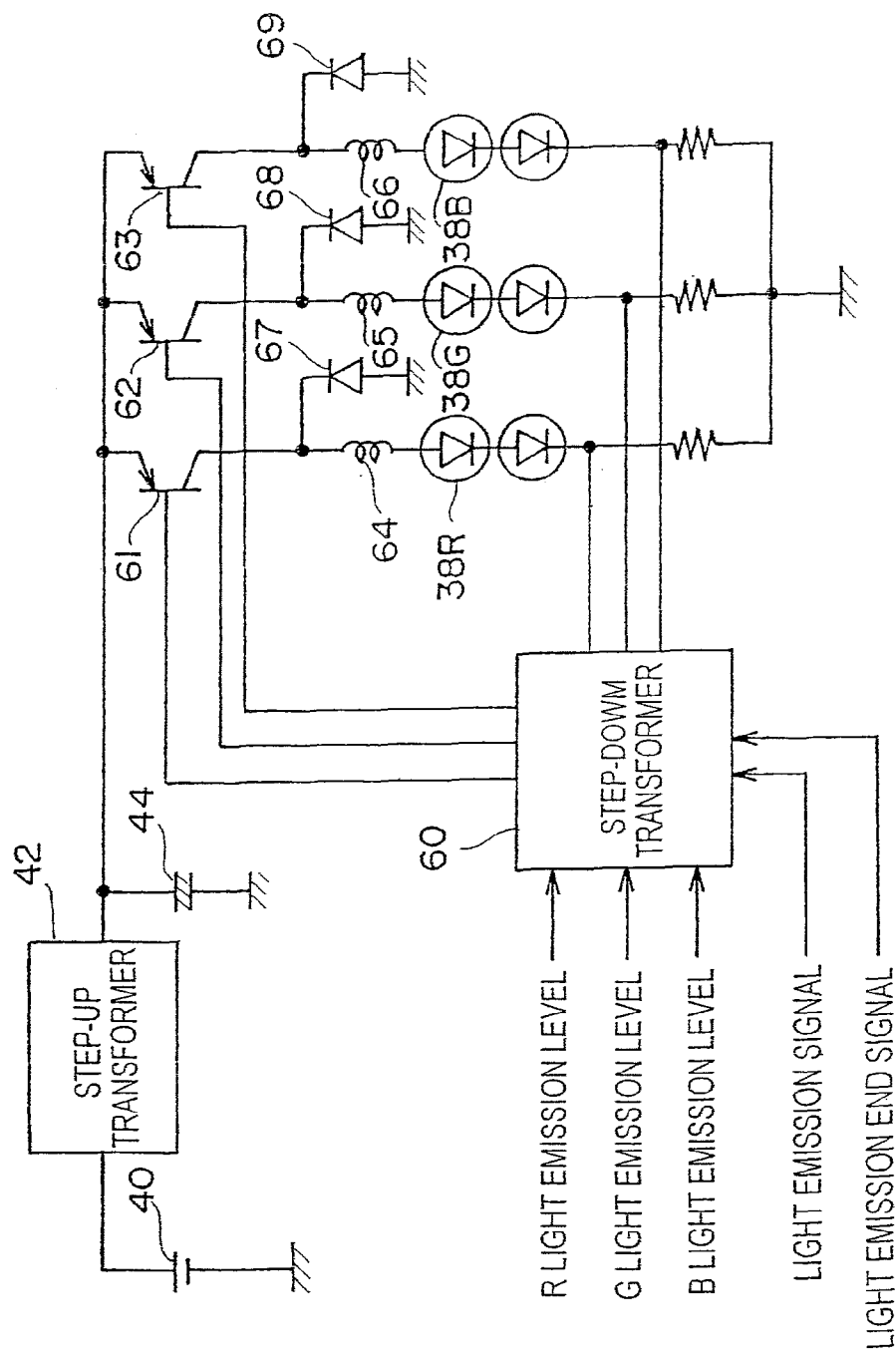
FIG. 6 is a circuit diagram showing another method of controlling light emitting amounts of LEDs.

FIG. 6 is a circuit diagram showing another method of controlling the light emitting amounts of the LEDs 38.

The electric currents flow from the capacitor 44 to the LEDs 38 through transistors 61, 62 and 63 and inductors 64, 65 and 66.

A step-down transformer 60 receives signals indicating R, G and B light-emitting levels, the light-emission signal in synchronization with the shutter release, and the light-emission stop signal. After receiving the light-emission signal, the step-down transformer 60 outputs pulses with a controlled duty ratio to bases of the transistors 61, 62 and 63 so that the electric currents corresponding to the light-emitting levels flow through the LEDs 38 until receiving the light-emission stop signal.

The transistors 61, 62 and 63 turn on and off due to the pulses, and pass the electric currents to the LEDs 38R, 38G and 38B through the inductors 64, 65 and 66 while they are on. While they are off, electric currents flows to the LEDs 38R, 38G and 38B through diodes 67, 68 and 69 due to induction electromotive forces of the inductors 64, 65 and 66.

The step-down transformer 60 monitors the electric currents flowing through the LEDs 38, and adjusts the duty ratio of the pulses inputted to the transistors 61, 62 and 63 according to the light emitting levels.

As shown in FIG. 7, light-emitting times of the LEDs 38R, 38G and 38B may be controlled for a desired ratio between the light-emitting amounts of the LEDs 38.

When the ratio between the B, R and G light-emitting amounts (the same as the ratio between the light-emitting times, for convenience) is 1:2:4, the LEDs 38R, 38G and 38B start emitting the lights at one time, and the LEDs 38B stop emitting the lights a time t later, and the LEDs 38R stop emitting the lights a time 2t later, and the LEDs 38G stop emitting the lights a time 4t later.

The time t will be explained.

A reference value $V_{ref}'$ is calculated by the following equation 1, $$V_{ref}'=\{3a/(a+b+c)\} \times V_{ref} \qquad \text{equation 1,}$$

wherein $V_{ref}$ is the reference value for adjusting the light-emission amounts and a:b:c (a≤b≤c) is the ratio between the light-emitting amounts.

When the ratio a:b:c is 1:2:4 as shown in FIG. 7, the reference value $V_{ref}'$ is (3/7) $V_{ref}$.

The LEDs 38R, 38G and 38B start emitting the lights at one time, and the light adjusting circuit 54 determines the light emission amount with the light-receiving sensor 34. When the light emission amount reaches the reference value $V_{ref}'$, the LEDs with the lowest light emission amount (the LEDs 38B in this case) stop emitting the lights, and the light emission time t is measured. Then, the light emission times of the other LEDs according to the light emission time t and the ratio (a:b:c) are calculated. In case of the ratio 1:2:4, the light emission time of the LEDs 38R is 2t, and the light emission time of the LEDs 38G is 4t. In the embodiment, the light-receiving sensor 34 that is sensitive to all the R, G and B lights, but a light-receiving sensor that is sensitive only to the lights with the lowest light emission amount may be used. In this case, the number 3a in the equation 1 is replaced with the number a.

FIG. 8 shows a case in which the duty ratios of the LEDs 38R, 38G and 38B are adjusted to control the color temperature of the electronic flash light (the ratio between the R, G and B light-emission amounts).

The duty ratios of the LEDs 38R, 38G and 38B are determined so that the ratio between the total light-emitting times of the LEDs 38 is the ratio between the R, G and B light emission amounts.

The LEDs 38R, 38G and 38B start emitting the lights at one time, and end it at one time when the light emission amount reaches the desired amount.

If each LED can be turned on and off, the numbers of the LEDs 38R, 38G and 38B to be turned on may be controlled.

FIG. 9 is a block diagram showing a second embodiment of an electronic flash 70 of the camera according to the present invention.

Unlike the electronic flash 10 of the first embodiment, the electronic flash 70 does not adjust the color temperature and has only a milky-white LED 71. Switches S1 and S2 turn on and off with an electronic flash switch. When the switches S1 and S2 are turned on, a step-up transformer 73 outputs a voltage from that of a battery 72 to charge a capacitor 74. When the switch S1 is turned on, an LED 75 for indicating the charging is turned on. When the voltage of the capacitor 74 reaches a reference voltage inputted to an operational amplifier 76, the charging is finished and the LED 75 turns off.

A switch S3 is a normally open switch, and it is closed for an instant when the shutter release button is pushed.

When the switch S3 is open, a capacitor 78 is charged to more than a predetermined voltage with a light-receiving sensor 77 for the light adjusting, and an operational amplifier 79 outputs an L-level signal to turn off a transistor 80. Thus, the electric current does not flow through the LED 71 and it does not emit a light even when the capacitor 74 for the light emission has been charged.

When the shutter release button is pushed and the switch S3 is closed, the capacitor 78 discharges and the operational amplifier 79 outputs an H-level signal to turn on the transistor 80. This allows the flow of electric current from the capacitor 74 to the LED 71, which emits the light.

Then, the capacitor 78 is charged with the light-receiving sensor 77 for the light adjusting. When the voltage of the capacitor 78 reaches that of a resistor 81, the operational amplifier 79 outputs the L-level signal to turn off the transistor 80. This turns off the LED 71.

A resistance of an adjustable resistor 82 can be adjusted according to the guide number, and this changes the voltage of the resistor 81 to adjust the light emission amount of the LED 71. A switch S4 that turns on with the shutter release button may be provided instead of an automatic electronic flash circuit (including the light-receiving sensor 77 for the light adjusting) which is enclosed by a dashed line.

Figure 10:
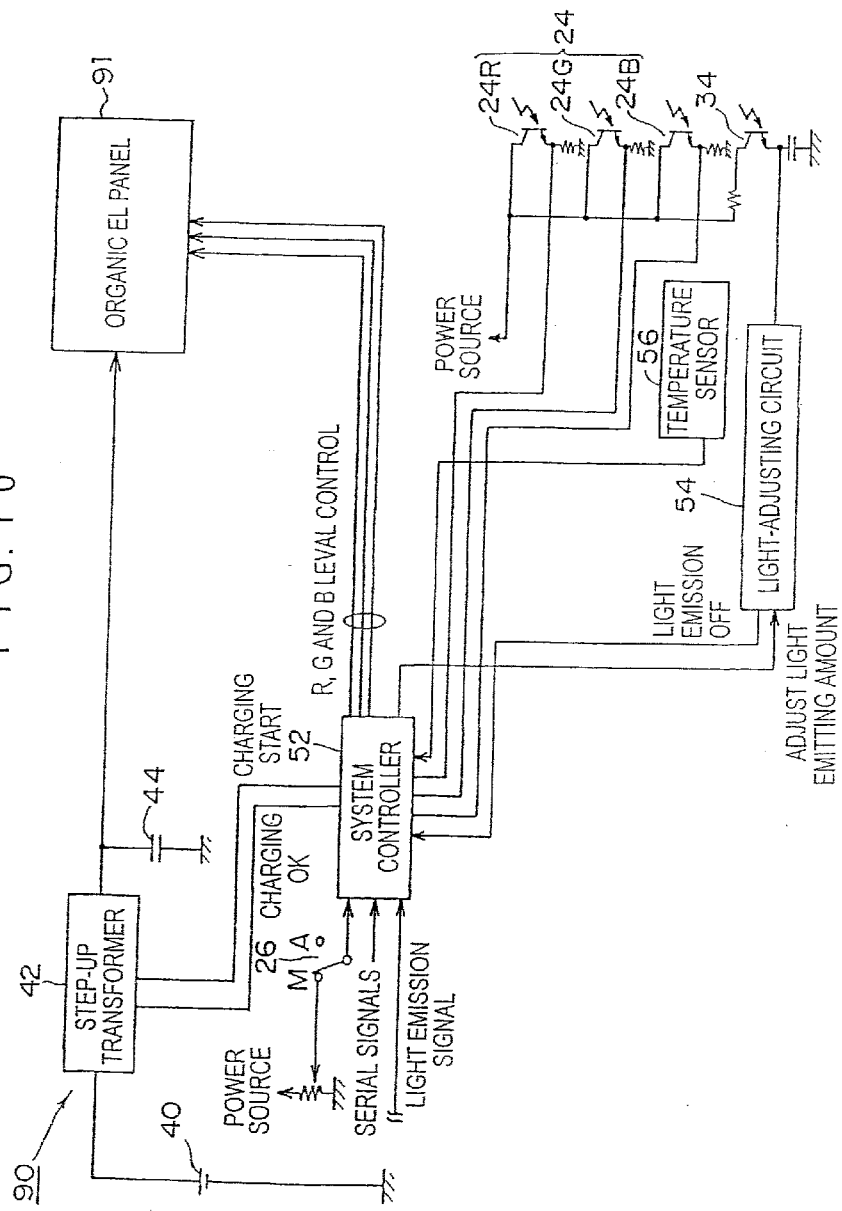
FIG. 10 is a block diagram showing a third embodiment of an electronic flash of the camera according to the present invention.

FIG. 10 is a block diagram showing a third embodiment of an electronic flash 90 of the camera according to the present invention.

Unlike the electronic flash 10 of the first embodiment, the electronic flash 90 has an organic electroluminescence panel (organic EL panel) 91. Parts that are the same as those in FIG. 4 are denoted by the same reference numerals, and they will not be explained in detail.

The organic EL panel 91 is formed in such a manner that R organic ELs whose spectrum peak wavelength is 600-740 nm (red area), G organic ELs whose spectrum peak wavelength is 500-600 nm (green area) and B organic ELs whose spectrum peak wavelength is 380-500 nm (blue area) are arranged in the same way as the LEDs 38 in FIG. 3(B). Light emitting brightnesses and times of the R, G and B organic ELs are controlled according to control signals inputted from the system controller 52.

This enables the organic EL panel 91 to emit a light with the desired color temperature.

A plasma light-emitting device panel in which plasma light-emitting devices are arranged as an array may be used instead of the organic EL panel 91. The plasma light-emitting devices stimulates R, G and B fluorescent materials by emitting ultraviolet rays to make them emit R, G and B lights.

Figure 11:
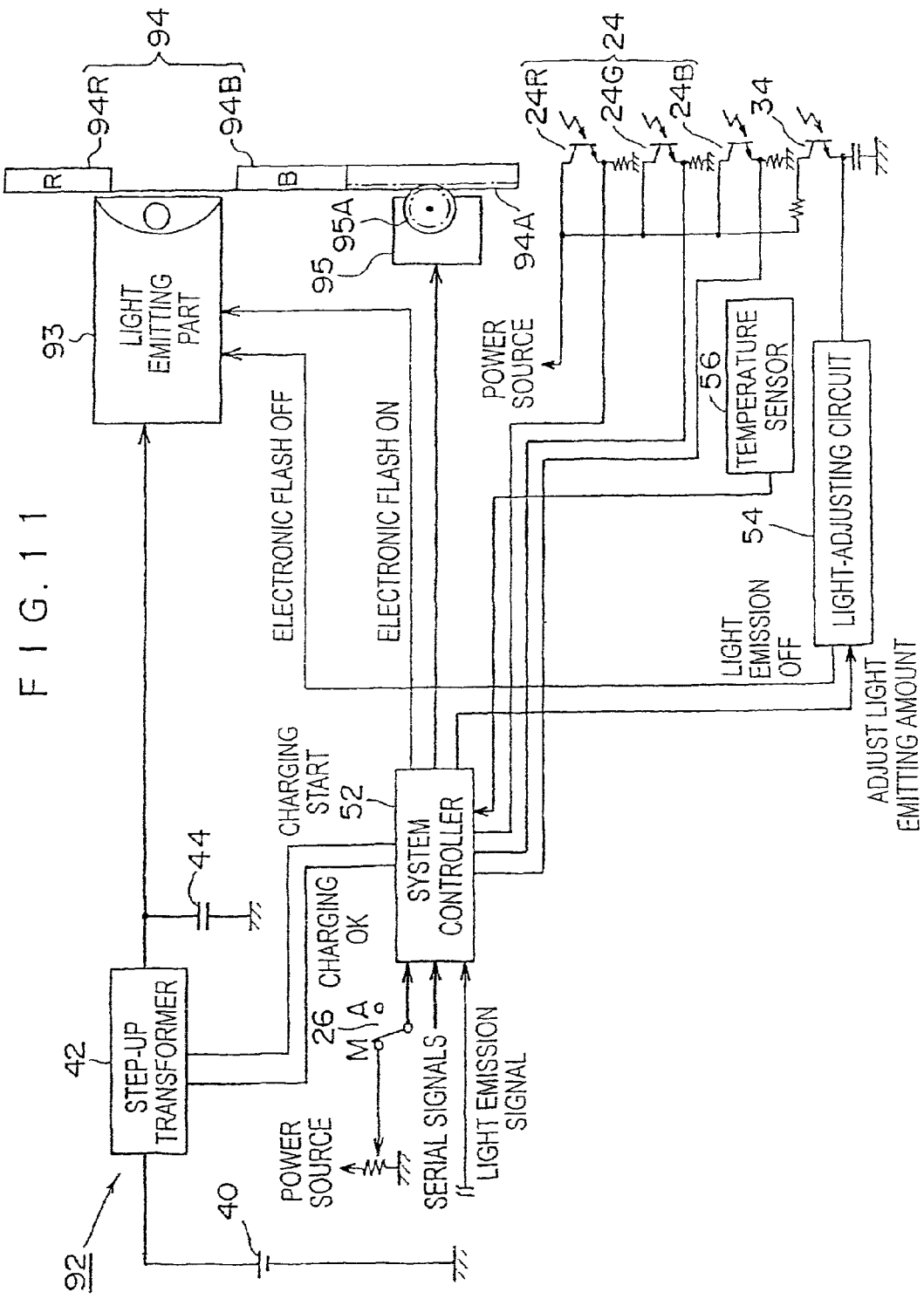
FIG. 11 is a block diagram showing a fourth embodiment of an electronic flash of the camera according to the present invention.

FIG. 11 is a block diagram showing a fourth embodiment of an electronic flash 92 of the camera according to the present invention.

Unlike the electronic flash 10 of the first embodiment, the electronic flash 92 has a light source that can change the color temperature of the electronic flash light with color filters 94. Parts that are the same as those in FIG. 4 are denoted by the same reference numerals, and they will not be explained in detail.

The light source is composed of a light emitting part 93 that emits a white light, the color filters 94 (an R filter 94R and a B filter 94B) and a filter driving motor 95.

The color filters 94 are movably provided in front of the light emitting part 93, and a rack 94A is connected to one end of the color filters 94. A pinion 95A engaged with the rack 94A is fixed to a driving shaft of the filter driving motor 95. Driving the filter driving motor 95 moves the color filters 94 vertically in FIG. 11.

The light source emits a light with the color temperature (5500-6000 degrees Kelvin) of the daytime sun when the light emitting part 93 is not covered as shown in FIG. 11. When the R filter 94R covers the light emitting part 93, the light source emits a light with the color temperature (2000-3000 degrees Kelvin) of the rising or setting sun. When the B filter 94B covers the light emitting part 93, the light source emits a light with the color temperature (10000-20000 degrees Kelvin) of the blue sky.

When the color temperature of the electronic flash light is set automatically or manually, the system controller 52 controls the filter driving motor 95 to move the color filters 94 for the light with the color temperature that is the closest to the set color temperature. When the shutter release button is fully pushed and the system controller 52 receives the light emission signal in synchronization with the shutter release, the system controller 52 outputs an electronic flash ON signal to the light emitting part 93 to emit the light.

The light adjusting circuit 54 determines the light emission amount with the light-receiving sensor 34 for the light adjusting. When the light emission amount reaches a reference value, the light adjusting circuit 54 outputs an electronic flash OFF signal to the light emitting part 93 to stop the light emission.

Figure 12:
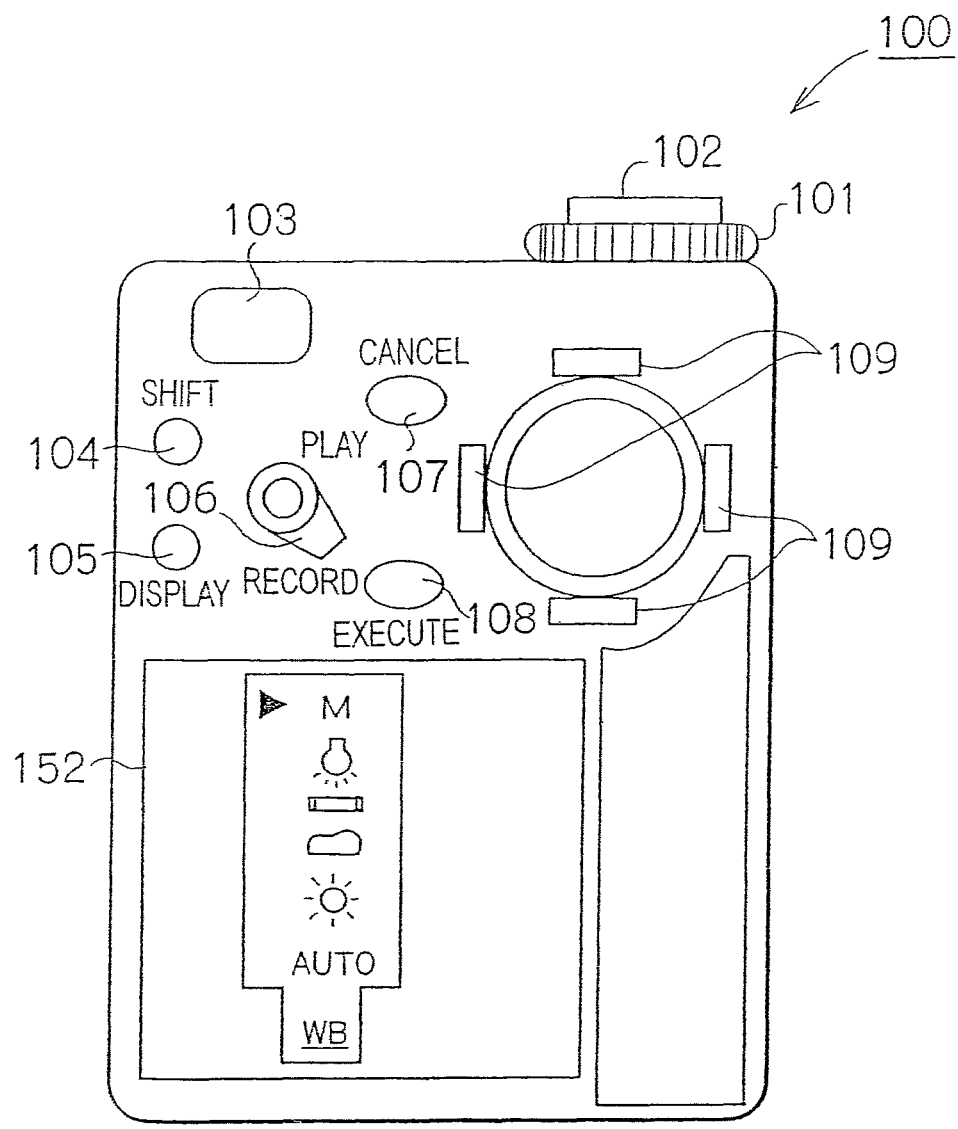
FIG. 12 is a back view of an electronic camera that can adjust a color temperature of an electronic flash light according to the present invention.

FIG. 12 is a back view of an electronic camera 100 that can adjust the color temperature of the electronic flash light according to the present invention.

The user rotates a mode dial 101 to set one of shooting modes including a manual shooting mode, an automatic shooting mode and a person shooting mode. A shutter release button 102 is provided in the center of the mode dial 101, and the shutter release button 102 can be pushed half and fully.

As shown in FIG. 12, an eyepiece 103, a shift key 104, a display key 105, a record mode/play mode switch 106, a cancel key 107, an execution key 108, a multifunction cross key 109 and a liquid crystal monitor 152 are provided on the back of the digital camera.

Figure 13:
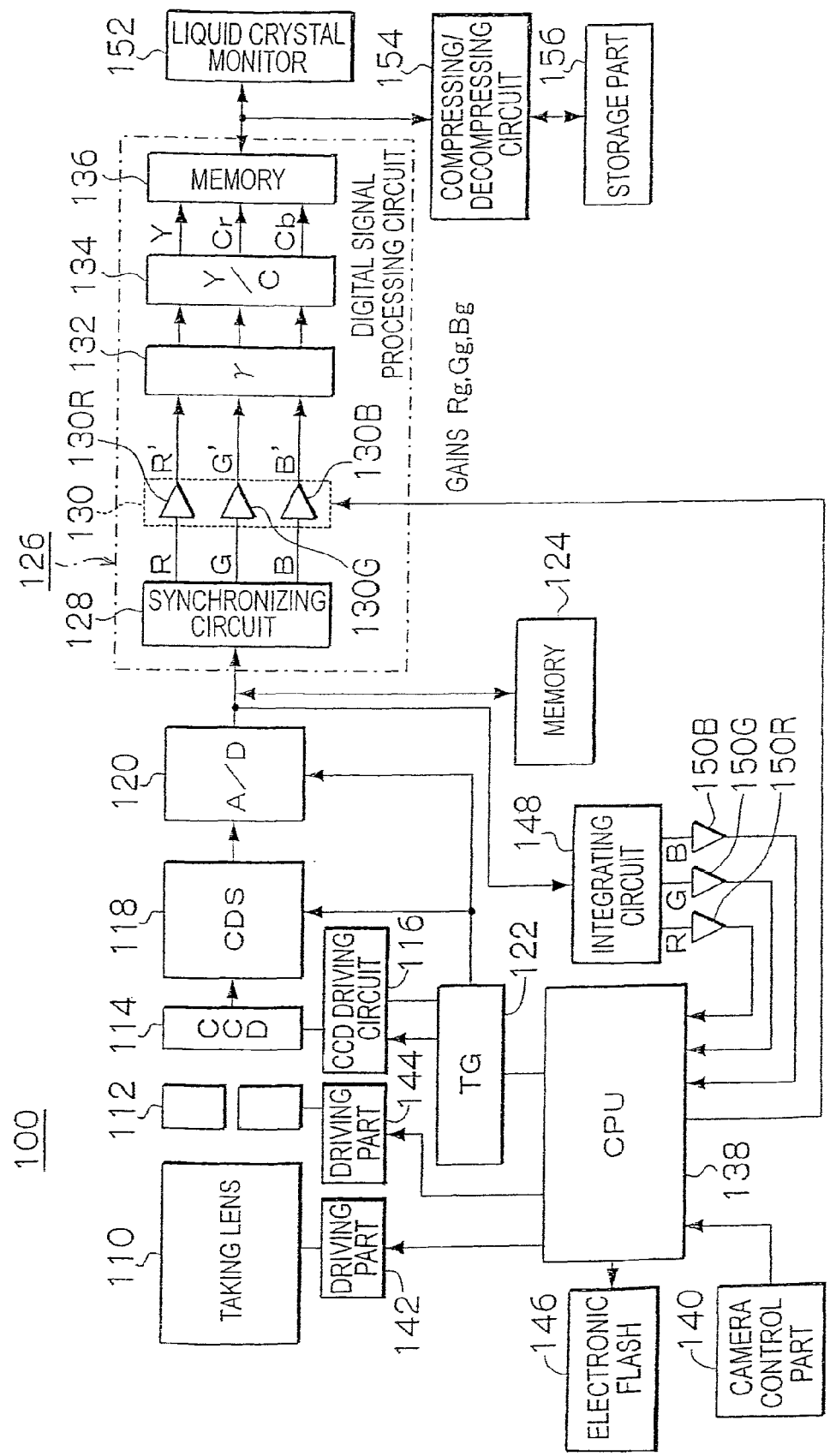
FIG. 13 is a block diagram showing an inner structure of the electronic camera in FIG. 12.

FIG. 13 is a block diagram showing the inner structure of the electronic camera 100 in FIG. 12.

A subject image formed on a light-receiving surface of a charge coupled device (CCD) 114 through a taking lens 110 and a diaphragm 112 is converted into signal electric charges corresponding to the amount of an incident light by each sensor. The stored signal electric charges are read out to shift registers with read gate pulses applied from a CCD driving circuit 116, and sequentially read out as voltage signals corresponding to the signal electric charges with register transfer pulses. The CCD 114 has an electric shutter function for controlling the exposure time (shutter speed) by outputting the stored signal electric charges with shutter gate pulses.

The voltage signals are outputted from the CCD 114 to a correlative double sampling circuit (CDS circuit) 118, which samples and holds R, G and B signals of each pixel. The CDS circuit 118 outputs the R, G and B signals to an A/D converter 120, which converts the R, G and B signals into digital R, G and B signals and outputs the digital R, G and B signals. The CCD driving circuit 116, the CDS circuit 118 and the A/D converter 120 are synchronized by timing signals outputted from a timing generator 122.

The digital R, G and B signals outputted from the A/D converter 120 are temporarily stored in a memory 124, and then outputted to a digital signal processing circuit 126. The digital signal processing circuit 126 comprises a synchronizing circuit 128, a white balance adjusting circuit 130, a gamma correcting circuit 132, a YC signal producing circuit 134 and a memory 136.

The synchronizing circuit 128 converts the dot-sequential R, G and B signals read from the memory 124 into synchronous R, G and B signals, which are outputted to the white balance adjusting circuit 130. The white balance adjusting circuit 130 has multipliers 130R, 130G and 130B that increases or decreases digital values of the R, G and B signals, and the R, G and B signals are inputted to the multipliers 130R, 130G and 130B, respectively. White balance correction values (gains) Rg, Gg and Bg for adjusting the white balance are outputted from a central processing unit (CPU) 138 to the multipliers 130R, 130G and 130B, respectively. Each of the multipliers 130R, 130G and 130B multiplies the corresponding digital value and gain together, and the multipliers 130R, 130G and 130B get R', G' and B' signals. The white balance adjusting circuit 130 outputs the R', G' and B' signals to the gamma correcting circuit 132. The gains Rg, Gg and Bg will be later explained in detail.

The gamma correcting circuit 32 corrects the R', G' and B' signals to R, G and B signals with desired gamma characteristic and outputs the R, G and B signals to the YC signal producing circuit 134. The YC signal producing circuit 134 produces luminance signals Y and chroma signals Cr and Cb (YC signals) from the R, G and B signals. The YC signals are stored in the memory 136.

The YC signals are read from the memory 136 and outputted from the liquid crystal monitor 152 so that a moving image or a still image is displayed on the liquid crystal monitor 152.

After the shooting, the YC signals are compressed with a predetermined format by the compressing/decompressing circuit 154, and the compressed image data is stored in a storage medium such as a memory card by a storage part 156. In the reproducing mode, the image data stored in the memory card or the like is decompressed, and the decompressed image data is outputted to the liquid crystal monitor 152 so that the image is displayed on the liquid crystal monitor 152.

The CPU 138 controls the circuits according to inputs from a camera control part 140 including the mode dial 101, the shutter release button 102 and the cross key 109. The CPU 138 also controls automatic focusing, automatic exposure and automatic white balance. For example, the automatic focusing is contrast automatic focusing that moves the taking lens 110 through a driving part 142 so that the high-frequency component of the G signal is the maximum when the shutter release button 102 is half pressed.

In the automatic exposure, the R, G and B signals are read, and the subject brightness (exposure values) is determined according to integrated values of the R, G and B signals. The F-number and the shutter speed are determined from the exposure value. When the shutter release button 102 is fully pressed, the CPU 138 drives the diaphragm 112 through a diaphragm driving part 144 for the determined F-number, and controls the exposure time for the determined shutter speed. Image data of one frame is captured and processed, and then stored in the storage medium.

The method of correcting the white balance will now be explained.

To manually correct the white balance, the user chooses the record mode with the record mode/play mode switch 106 and selects the manual shooting mode with the mode dial 101. Then, the user pushes the execution key 108 to display a menu for setting the white balance on the liquid crystal monitor 152 as shown in FIG. 12, and selects an icon (AUTO, icons showing subject light sources, and M) with the cross key 109. When the icon "AUTO" is selected, the color temperature of the subject light (the type of the subject light source) is measured and the white balance is corrected according to the color temperature. When one of the icons showing the light sources is selected, the white balance is corrected according to the subject light source. When the icon "M" is selected, a recorded color temperature is read and the white balance is corrected according to the color temperature.

The measurement of the color temperature of the subject light (the type of the subject light source) in the automatic shooting mode or when the icon "AUTO" is selected in the manual shooting mode will be explained.

The image is divided into multiple areas (8 by 8), and an integrating circuit 148 in FIG. 13 calculates average values of the R, G and B signals in each area stored in the memory 124 and outputs them to the CPU 138. Multipliers 150R, 150G and 150B are provided between the integrating circuit 148 and the CPU 138, and gains are inputted to the multipliers 150R, 150G and 150B.

The CPU 138 determines the subject light source (daylight, shade-cloudiness, a fluorescent lamp, a tungsten lamp, or the like) according to the average values of the R, G and B signals in each area. Ratios R/G and B/G between the average values of the R, G and B signals in each area are calculated, and determination frames for the subject light sources are set on a co-ordinate system with the ratio R/G as the x coordinate and the ratio B/G as the y coordinate. The number of areas in each determination frame is determined, and the subject light sources is determined according to the brightness level of the subject and the number of areas in each determination frame (see Japanese Patent Provisional Publication No. 2000-224608). The method of determining the subject light source (color temperature) is not limited to this.

After determining the subject light source, the CPU 138 determines the white balance correction values (gains) Rg, Gg and Bg that are suitable for the subject light source and outputs them to the multipliers 130R, 130G and 130B, respectively. The multipliers 130R, 130G and 130B outputs the white-balanced R', G' and B' signals to the gamma correcting circuit 132.

The digital signal processing circuit 126 corrects the white balance in the embodiment, but an analog signal processing including the CDS circuit 118 and a gain control amplifier (not shown) may do that. The ratios R/G and B/G are changed in the embodiment, but the chroma signals Cr and Cb may be changed.

The method of controlling the electronic flash 146 will now be explained.

Figure 14:
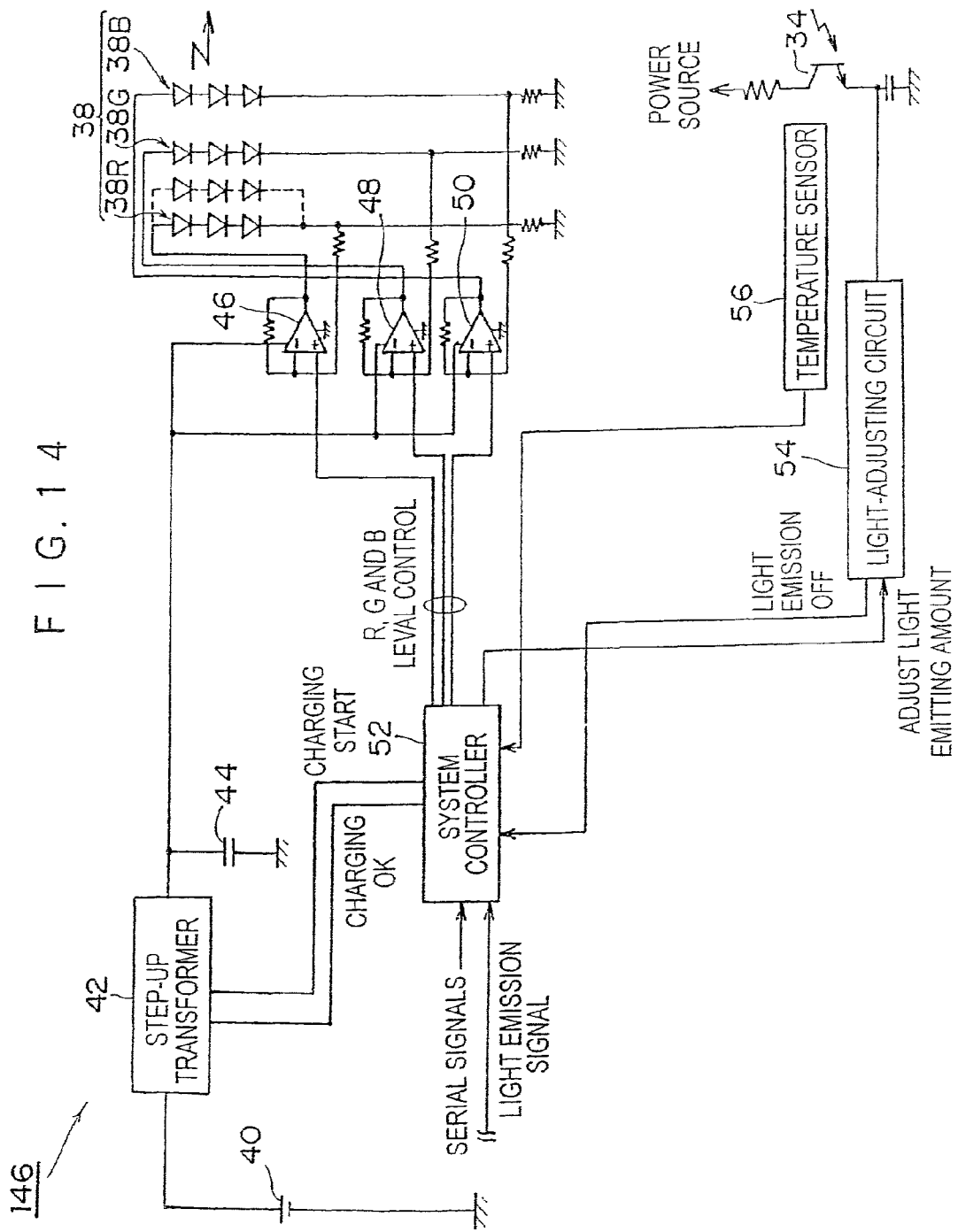
FIG. 14 is a block diagram of an electronic flash that is built in or attached to the electronic camera in FIG. 12.

FIG. 14 is a block diagram of the electronic flash 146 that is built in or attached to the electronic camera 100. Parts that are the same as those in FIG. 4 are denoted by the same reference numerals, and they will not be explained.

The electronic flash 146 is different from the electronic flash 10 of the first embodiment in that it does not have the color temperature sensors 24 for determining the color temperature of the subject light source. The color temperature is determined according to the R, G and B signals obtained from the CCD 114.

The CPU 138 outputs the light-emission signal in synchronization with the shutter release and serial signals indicating the light emission amount and the color temperature of the electronic flash light to the system controller 52 of the electronic flash 146.

A conventional electronic camera prohibits the light emission in the manual white balance mode, so that the electronic flash light does not affect the manually-corrected white balance. However, the electronic camera 100 of the present invention does not prohibit the light emission even in the manual white balance mode.

In addition, the conventional electronic camera does not perform either the automatic white balance correction or the manual white balance correction, and adjusts the white balance with the fixed gains according to the electronic flash light (the daylight) to perform a shooting with the electronic flash. However, the electronic camera 100 of the present invention performs the automatic white balance correction or the manual white balance correction.

The electronic camera 100 controls the electronic flash 146 to emit the light with the automatically-measured color temperature of the subject light source in the automatic white balance mode. The electronic camera 100 controls the electronic flash 146 to emit the light with the manually-set color temperature in the manual white balance mode.

Therefore, the electronic flash light does not affect the automatically or manually corrected white balance.

FIG. 15 is a perspective view of a light emitting head 190.

The light emitting head 190 has a rectangular diffusion plate 192, and R, G and B LEDs 193R, 193G and 193B are provided on the four sides of the diffusion plate 192, and a dish-shaped reflecting mirror 194 is arranged on the bottom of the diffusion plate 192. Mirrors may be provided on parts of the sides of the diffusion plate 192 without the LEDs 193R, 193G and 193B to prevent lights from leaking through the sides.

The LEDs 193R, 193G and 193B emit lights out of the diffusion plate 192 through its top.

The number of the G LEDs 193G is larger than those of the R and B LEDs 193R and 193B to produce a white light. A number of LEDs may be arranged on the sides of the diffusion plate 192. The diffusion plate 192 does not necessarily have to be rectangular, and it may be a polygonal prism or a cylinder. A light guide member may be used instead of the diffusion plate 192, and a diffusion plate is provided only on its light emission surface.

According to the present invention, since the LEDs, the organic ELs or the plasma light-emitting devices are used as the electronic flash light source, the light-emission (brightness) level and the light emission time can be easily changed. In addition, since the R, G and B light-emitting devices are used, the color temperature of the electronic flash light can be manually or automatically changed. For example, back light correction for the sun light in the morning or evening can be performed according to the color temperature of the sun light, and this prevents unnatural colors of a picture due to the electronic flash light.

Moreover, since the large-capacity capacitor is charged slowly and it discharges quickly, the electric energy can be obtained with the small battery. Furthermore, fall of the voltage of the battery can be prevented at the light emission, and misoperation of the other circuits can be prevented.

The LEDs or the like can continuously emit the lights for slow shutter speeds, and they can be used as a light source at the auto focus.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera that stores color image signals of subject image including one of a still image and a moving image captured with a taking lens and an imaging device, the electronic camera comprising:
    a color temperature determining device that determines a ratio of R and G color signals and a ratio of B and G color signals which are obtained through an image sensor of the camera and utilizes the ratios to determine color temperature of subject light from the color image signals of the subject image captured with the taking lens and the imaging device;
    an electronic flash light source that emits electronic flash light, said light source having a plurality of light emitting diodes that emit different wavelength light;
    a light emission control device that determines a desired light emission color so as to adapt to the color temperature of the subject light determined by said color temperature determining device, and controls to turn on and off the plurality of light emitting diodes with duty ratios, and controls the duty ratios of turning on and off of the plurality of light emitting diodes so as to adapt a color temperature of the electronic flash light to the desired light emission color.

2. The electronic camera as defined in claim 1, wherein the electronic camera further comprising:
    a white balance correcting device that corrects a white balance of the color image signals based on the color temperature of the subject light determined by said color temperature determining device.

3. The electronic camera as defined in claim 1, wherein the color temperature determining device determines color temperature of subject light by dividing an image of the color image signals into multiple areas and calculating respective average integrated value of R, G, and B signals in each area.

4. The electronic camera as defined in claim 1, wherein the electronic flash light source further comprising:
    at least one diffusion plate which diffuses light from the plurality of light emitting diodes.

5. The electronic camera as defined in claim 1, wherein the light emission control device makes both of a start and end of each light emission of the plurality of light emitting diodes to be the same, wherein light emission of each of the plurality of light emitting diodes ends when amounts of the electronic flash light reach desired amounts.

6. The electronic camera as defined in claim 2, wherein the color temperature determining device determines color temperature of subject light by dividing an image of the color image signals into multiple areas and calculating respective average integrated value of R, G, and B signals in each area.

7. The electronic camera as defined in claim 2, wherein the electronic flash light source further comprising:
   at least one diffusion plate which diffuses light from the plurality of light emitting diodes.

8. The electronic camera as defined in claim 2, wherein the light emission control device makes both of a start and end of each light emission of the plurality of light emitting diodes to be the same, and wherein light emission of each of the plurality of light emitting diodes ends when amounts of the electronic flash light reach desired amounts.

9. The electronic camera as defined in claim 2, wherein the color temperature determining device determines color temperature of subject light by dividing an image of the color image signals into multiple areas and calculating respective average integrated value of R, G, and B signals in each area; and
   wherein the electronic flash light source further comprising:
   at least one diffusion plate which diffuses light from the plurality of light emitting diodes.

10. The electronic camera as defined in claim 2, wherein the color temperature determining device determines color temperature of subject light by dividing an image of the color image signals into multiple areas and calculating respective average integrated value of R, G, and B signals in each area; and
    wherein the light emission control device makes both of a start and end of each light emission of the plurality of light emitting diodes to be the same, and wherein light emission of each of the plurality of light emitting diodes ends when amounts of the electronic flash light reach desired amounts.

11. The electronic camera as defined in claim 2, wherein the electronic flash light source further comprising:
    at least one diffusion plate which diffuses light from the plurality of light emitting diodes; and
    wherein the light emission control device makes both of a start and end of each light emission of the plurality of light emitting diodes to be the same, and wherein light emission of each of the plurality of light emitting diodes ends when amounts of the electronic flash light reach desired amounts.

12. The electronic camera as defined in claim 2, wherein the color temperature determining device determines color temperature of subject light by dividing an image of the color image signals into multiple areas and calculating respective average integrated value of R, G, and B signals in each area;
    wherein the electronic flash light source further comprising: at least one diffusion plate which diffuses light from the plurality of light emitting diodes; and
    wherein the light emission control device makes both of a start and end of each light emission of the plurality of light emitting diodes to be the same, and wherein light emission of each of the plurality of light emitting diodes ends when amounts of the electronic flash light reach desired amounts.

13. The electronic camera as defined in claim 3, wherein the electronic flash light source further comprising:
    at least one diffusion plate which diffuses light from the plurality of light emitting diodes.

14. The electronic camera as defined in claim 3, wherein the light emission control device makes both of a start and end of each light emission of the plurality of light emitting diodes to be the same, and wherein light emission of each of the plurality of light emitting diodes ends when amounts of the electronic flash light reach desired amounts.

15. The electronic camera as defined in claim 3, wherein the electronic flash light source further comprising:
    at least one diffusion plate which diffuses light from the plurality of light emitting diodes; and
    wherein the light emission control device makes both of a start and end of each light emission of the plurality of light emitting diodes to be the same, and wherein light emission of each of the plurality of light emitting diodes ends when amounts of the electronic flash light reach desired amounts.

16. The electronic camera as defined in claim 4, wherein the light emission control device makes both of a start and end of each light emission of the plurality of light emitting diodes to be the same, and wherein light emission of each of the plurality of light emitting diodes ends when amounts of the electronic flash light reach desired amounts.

\* \* \* \* \*